United States Patent [19]
Grohoski et al.

[11] Patent Number: 5,999,992
[45] Date of Patent: *Dec. 7, 1999

[54] SYSTEM AND METHOD FOR CONTROLLING THE DIRECTION OF DATA FLOW BETWEEN COMPUTING ELEMENTS

[75] Inventors: Gregory Frederick Grohoski, Cedar Park; William Rudolph Hardell, Jr.; Paul Joseph Jordan, both of Austin; Oscar Reid Mitchell, Pflugerville; Tung Manh Nguyen, Austin; Yonjae Rim, Cedar Park, all of Tex.

[73] Assignee: International Business Machines, Armonk, N.Y.

[*] Notice: Under 35 U.S.C. 154(b), the term of this patent shall be extended for 954 days.

[21] Appl. No.: 08/542,211

[22] Filed: Oct. 12, 1995

Related U.S. Application Data

[63] Continuation of application No. 08/168,619, Dec. 17, 1993, abandoned.
[51] Int. Cl.⁶ ...................................................... G06F 13/14
[52] U.S. Cl. .................................. 710/29; 710/5; 710/31; 710/104
[58] Field of Search .................................. 710/5, 20, 36, 710/104, 6, 7, 29, 31, 33, 38, 131; 370/53, 58.2, 67

[56] References Cited

U.S. PATENT DOCUMENTS

| | | | |
|---|---|---|---|
| 3,996,564 | 12/1976 | Kerrigan et al. | 710/48 |
| 4,218,740 | 8/1980 | Bennett et al. | 710/60 |
| 4,270,202 | 5/1981 | Stuttard et al. | 370/468 |
| 4,349,870 | 9/1982 | Shaw et al. | 712/38 |
| 4,402,067 | 8/1983 | Moss et al. | 365/96 |
| 4,467,413 | 8/1984 | Dshkhunian et al. | 710/126 |
| 4,509,113 | 4/1985 | Heath | 710/66 |
| 4,725,835 | 2/1988 | Schreiner et al. | 340/825.83 |
| 4,893,305 | 1/1990 | Fernandez et al. | 370/254 |
| 4,968,977 | 11/1990 | Chinnaswamy et al. | 340/825.8 |
| 5,047,922 | 9/1991 | Borkar | 710/2 |
| 5,189,665 | 2/1993 | Niehaus et al. | 370/248 |
| 5,261,056 | 11/1993 | Lyke | 709/247 |
| 5,274,763 | 12/1993 | Banks | 710/128 |
| 5,313,551 | 5/1994 | Labrousse et al. | 711/149 |
| 5,317,565 | 5/1994 | Crouse et al. | 370/354 |
| 5,321,813 | 6/1994 | McMillen et al. | 714/798 |
| 5,337,414 | 8/1994 | Hashemi et al. | 710/52 |
| 5,384,779 | 1/1995 | Patrick et al. | 370/434 |
| 5,396,512 | 3/1995 | Crabb et al. | 375/257 |
| 5,418,909 | 5/1995 | Jackowski et al. | 710/15 |
| 5,422,493 | 6/1995 | Kesterbaum et al. | 250/551 |
| 5,428,800 | 6/1995 | Hsieh et al. | 326/82 |

FOREIGN PATENT DOCUMENTS

| | | |
|---|---|---|
| 0 367 281 A2 | 3/1989 | Germany . |
| 0 367 284 | 11/1989 | Germany . |
| 60-132205 | 7/1985 | Japan . |
| 2-171948 | 7/1990 | Japan . |
| 0 228 794 | 11/1996 | United Kingdom . |

OTHER PUBLICATIONS

International Standard ISO 7498–1984, Information Processing Systems—Open Systems Interconnection—Basic Reference Model, pp. 1 through 40 (pp. 33 through 36 are of primary relevance).

International Standard ISO/IEC 8802–3: 1993, Information Technology—Local and metropolitan area networks—Part 3, pp. 31–113, 209–240, and 287–291.

IBM Tech. Disc. Bull. V.32, No.4A, Sep. 1989, Dual Bus Processor Archi.

IEEE Standards for Local and Metro. Area Networks: Overview and Architec., IEEE Std. 802–1990, pp. 9–31.

Short, "Microprocessors and Programmed Logic", Prentice–Hall, 1981, pp. 293–298.

*Primary Examiner*—Zarni Maung
*Assistant Examiner*—Viet Vu
*Attorney, Agent, or Firm*—Thomas G. Devine; Casimer K. Salys

[57] ABSTRACT

This invention relates to a system and method for adapting the ports of computing elements in transferring data between computing elements on a network. Ports of the computing elements are interconnected for data transfer through a switch complex. The interconnected ports are adapted to cooperate together in transferring the data. Data which is ordinarily designated to be transferred through one port of a computing element may be transferred through a different port.

24 Claims, 3 Drawing Sheets

SYSTEM AND METHOD FOR CONTROLLING THE DIRECTION OF DATA FLOW BETWEEN COMPUTING ELEMENTS

This application is a continuation of application Ser. No. 08/168,619, filed Dec. 17, 1993 now abandoned.

FIELD OF THE INVENTION

This invention relates generally to digital communications between computing elements connected together on a network, and more particularly to adapting the data ports on computing elements having at least two ports, in order to accommodate varying data transfer demands.

BACKGROUND OF THE INVENTION

Computers, including workstations, personal computers, and, in general, central processing units with associated memory, collectively referred to as "computing element", are commonly interconnected in a network so that they can interact to share information and share in processing information. In many networks the computing elements are permanently physically interconnected on a bus or set of busses. But since only one device can send data on a bus at one time only a limited amount of communication can take place on a single bus. Therefore, in networks having many computing elements it is useful to connect the computing elements to a switch or switch complex where a first computing element can be connected to a second, while a third computing element is connected to a fourth, and so on. In this manner a number of computing elements can communicate simultaneously.

In this arrangement where a switch provides a transmission medium for interconnecting numerous computing elements, the computing elements are connected to the switch by ports. The ports convert data to a physical and logical form suitable for the computing elements and the transmission medium. Ports may also convey information concerning the status of the computing elements and the switch.

The rate at which a port can transfer data varies according to the number of bits the port has, among other things. It is well known to adapt a port by increasing its bit width when necessary to increase the rate of data transfer through the port. There also exists a need to manage the use and adaptation of multiple ports on a computing element.

SUMMARY OF THE INVENTION

An objective of the invention is to increase the effective utilization of data ports on computing elements in a network.

Another objective is to increase the availability of data ports for transferring data to and from the computing elements.

A still further objective is to provide a flexible means to temporarily increase the bandwidth or bit width of data ports on computing elements in a network so that data may be transferred faster to and from the computing elements when faster transfers are needed.

Another objective is to control the increase in bandwidth or bit width of a data port without any control signals for that purpose on the physical layer of the network.

According to the present invention, the foregoing and other objectives are attained by providing a number of computing elements, each having a first port and a second port for transferring data. A switch complex interacts with the computing elements. The switch complex connects one of said ports of a first computing element to a port of another computing element, and also connects the other port of the first computing element to a port of another computing element, so that data may be transferred between the connected ports. In a type of data transfer contemplated by the present invention and referred to herein as a "cooperating-port" transfer, one of the ports on the first computing element is dedicated to transfer data that would otherwise be designated for transferring by the computing element's other port, allowing faster data transfer.

In a further aspect of the invention, and in one of its embodiments, the network is organized in a hierarchy of functional layers, including a physical layer providing an electrical circuit and a data link layer providing communication of data over the circuit in a predefined format. Although the interaction among the computing elements and the switch complex may be limited to communication through the data ports, referred to as "fully inband" communication, the system nevertheless establishes a cooperating-port transfer using communication between computing elements, and communicating only through the data ports of the computing elements. In accordance with another aspect of the invention in this embodiment, the cooperating-port transfer is established by communication on the data link layer using a protocol.

In the above described embodiment the invention concerns an environment where the computing element data ports function as master and slave ports. In a noncooperating-port transfer, as would be executed without this invention, data which is transferred from a computing element at the request of that computing element is transferred through only the master port of the computing element. According to an aspect of this embodiment of the invention in the master-slave environment, a computing element initiates a request through the computing element's master port, and establishes a cooperating-port transfer. In that transfer, both the master and slave ports of the computing element transfer data.

In another embodiment, the invention concerns an environment where the computing element data ports function as an input port and an output port. An input port on a computing element has a directional orientation for transferring data in a direction into the computing element. Likewise, an output port on a computing element has a directional orientation for transferring data in a direction out of the computing element. In a noncooperating-port transfer, as would be executed without this invention, for example, data which is transferred out of a computing element is transferred through only the output port of the computing element. According to an aspect of this embodiment of the invention in the input-output port environment, the orientation of one of the ports is reversed to provide a cooperating-port transfer. In that transfer, both the input and output ports of the computing element transfer data in the same direction.

A further aspect of the invention in the above described embodiment is described as follows. In a cooperating-port transfer, when one of the computing element ports has ceased data transfer and has thereby become available for transferring additional data, the available port assumes an orientation opposing the other port that is still transferring data, so that the computing element has one port oriented in each direction.

The invention is thus advantageous in the master-slave port environment, in that a computing element may increase the data transfer rate when needed for a particular transfer by utilizing its slave port to assist its master port in the data transfer. It is also advantageous in that the invention may be practiced on a system having a switch complex which is not able to distinguish the cooperative-port data transfer request from other data transfer requests.

The invention is thus advantageous in the input-output port environment, in that orienting a port in each direction immediately whenever a port becomes available effectively increases the availability and the utilization of the data ports on a computing element. That is, the steps required to reverse the data transfer direction of a computing element port are executed in anticipation of an actual request for data transfer through the port, so that those steps are already completed upon the occurrence of an actual demand for data transfer. Then, since a port has already oriented in each direction, data transfers which arise later may be executed in either direction without requiring any time to reverse the direction of the port.

The invention is intended to be limited only as defined in the claims. Additional objects, advantages, and novel features are set forth in the following description, or will be apparent to those skilled in the art or those practicing the invention. Other embodiments are within the spirit and scope of the invention. These objects and embodiments may be achieved by combinations pointed out in the appended claims.

DETAILED DESCRIPTION

Figure 1:
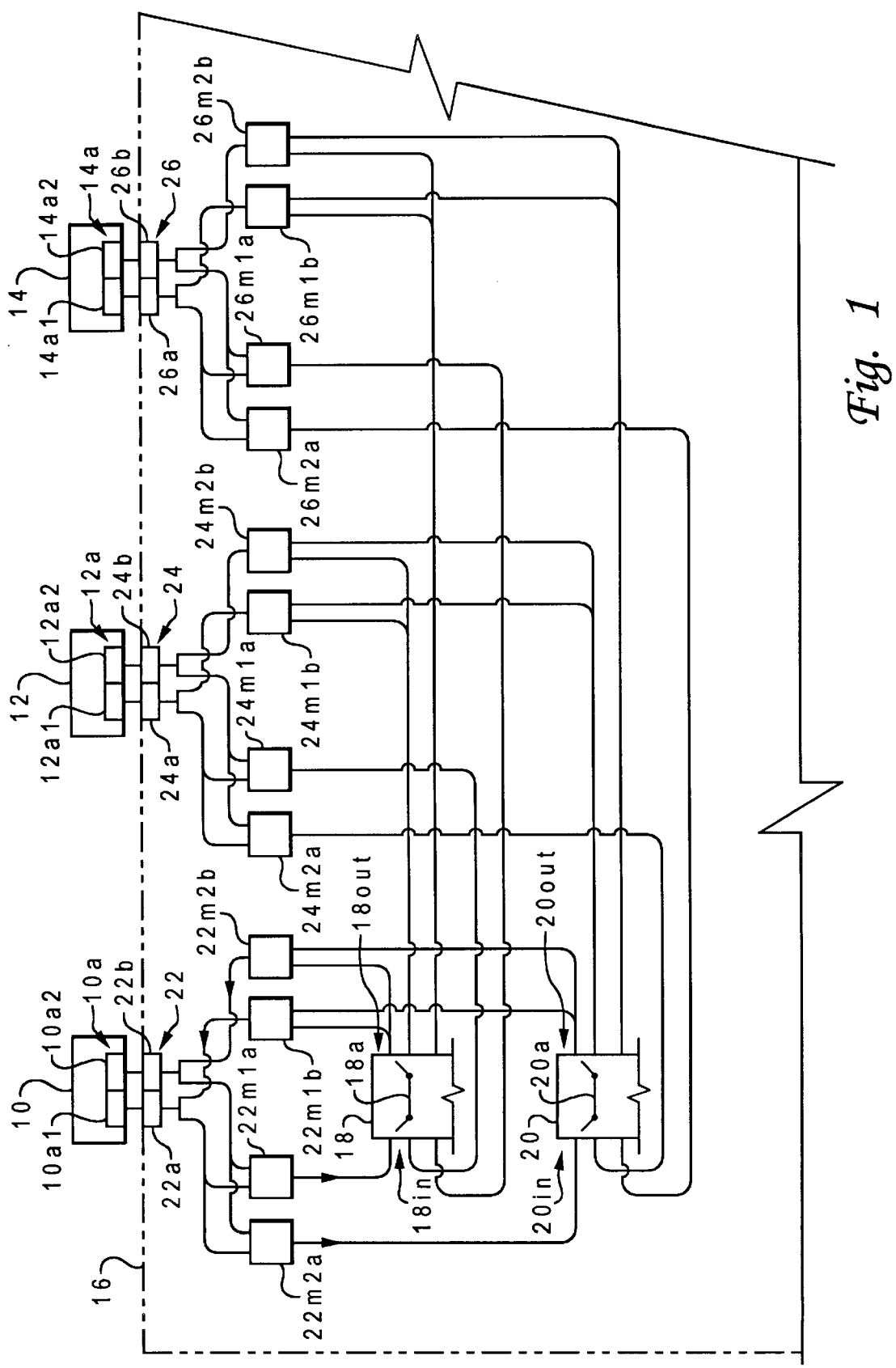
FIG. 1 is a schematic depicting a number of computing elements connected to a switch complex.

FIG. 1 schematically depicts a network for transferring data between a number of computing elements 10, 12, and 14. The network may be organized in a hierarchy of functional "layers", including physical, data link, and network layers, in accordance with industry standards ISO 7498, "Information Processing Systems—Open Systems Interconnection—Basic Reference Model," which is incorporated herein by reference.

The system includes an n bit data port on a number of computing elements, e.g., 10a. The n bit port 10a has a first and second set of n/2 bits providing a first and second n/2 bit port 10a1 and 10a2 within the n bit port 10a. The n bits are bi-directional so that both of the n/2 ports can transfer either input or output data.

The system also includes a switch complex 16 for establishing a physical layer, electrical connection of a first computing element first n/2 port to any computing element second n/2 port while simultaneously connecting the first computing element second n/2 port to a computing element first n/2 port. To provide a transmission medium the switch complex has a first and second n/2 bit data bus 18a and 20a. Each bus is associated with a one-bus switch 18 and 20. The switch complex 16 also provides data ports 22, 24, and 26 for connection with data ports 10a, 12a, and 14a on the computing elements 10, 12 and 14. The switch complex data ports 22, 24, and 26 are divided into a first set of ports 22a, 24a, and 26a and a second set of ports 22b, 24b and 26b.

The ports 22, 24 and 26 of the switch complex 16 have a first multiplexer, e.g., 22m1a connecting the port, e.g., 22a to the input side 18in of the first one-bus switch 18 and a second multiplexer, e.g., 22n2a connecting the port, e.g., 22a to the input side 20in of the second one-bus switch 20. Among the first set of switch complex ports 22a, 24a and 26a, the ports are connected externally to a corresponding first port 10a1, 12a1 and 14a1 on a computing element. The ports 22a, 24a, and 26a of the switch complex 16 have a first multiplexer, e.g., 22m1b connecting the port, e.g., 22b to the output side 18out of the first one-bus switch 18 and a second multiplexer, e.g., 22m2b connecting the port, e.g., 22 to the side 20 second one-bus switch 20. Among the second set of ports 22b, 24b and 26b, the ports are connected externally to a corresponding second port 10a2, 12a2, and 14a2 on a computing element.

There are also communications circuits (not shown) linking together the computing elements and the switch complex, allowing the computing elements and the switch complex to interact. The computing elements and the switch interact in accordance with a hierarchical organization of structural and functional "layers." The first layer is a "physical layer," which provides a transmission circuit. In that first layer the interaction occurs on a physical level as certain predefined voltage impulses, for example. The second layer is a "data link layer," which transforms the transmission circuit into a line that appears free of transmission error by using a protocol for data communication in a predefined format, and by using transmission error correction, and flow control, among other means.

In one embodiment the communications linking the computing elements and switch complex are fully inband, so that a computing element communicates with the switch complex and with other computing elements using only the two n/2 bit data ports on the computing element. In another embodiment, some communications links are external to the data ports. In either case, the system provides for data transfer wherein a first data packet is transferred between the first n/2 port, e.g., 10a1 of a first computing element 10 and an n/2 port, e.g., 12a2 of a computing element 12 through the first one-bus switch 18, while a second data packet may be independently transferred between the second n/2 port 10a2 of the first computing element 10 and an n/2 port, e.g., 12a1 of a computing element 12 through the second one-bus switch 20.

In one embodiment the first port of each computing element is a master port and the second port is a slave. In general a master port initiates requests and a slave port responds to requests. Thus, in the master-slave environment, data which a first computing element requests to send to a second computing element is ordinarily transmitted from the first computing element master port to the second computing element slave port. According to the terminology used herein, data such as this is "designated" to be transferred through the master port.

Figure 2:
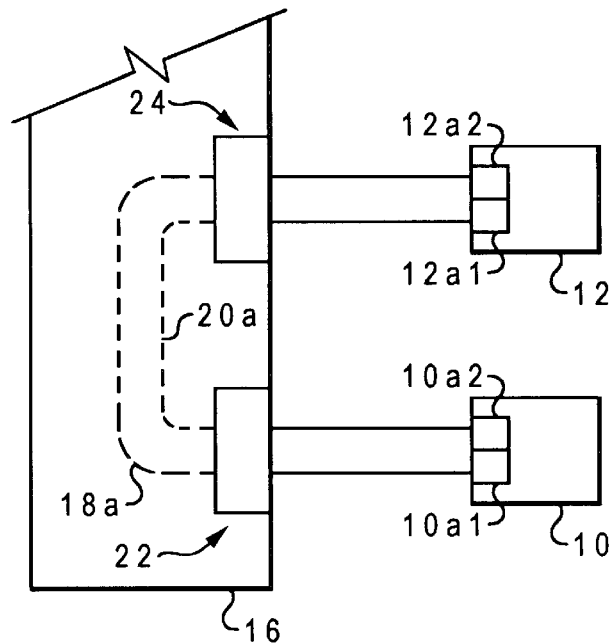
FIG. 2 is a schematic depicting one computing element having an electrical transmission circuit connected through the switch complex to another computing element.

Referring now to FIG. 2, in a type of data transfer which may be executed in the master-slave environment, a first, requesting computing element 10, and a second computing element 12 are interconnected by the first and second data bus 18a and 20a in the switch complex 16, and a single data packet is transferred in one direction in synchronized bytes through both n/2 ports 10a1 and 10a2 of the requesting computing element 10 to the other computing element 12. Thus the data packet, which would ordinarily in this environment be transferred through the master port 10a1 of the requesting computing element 10, is transferred through both the master and the slave ports 10a1 and 10a2 of that computing element 10. Since the two ports 10a1 and 10a2 cooperate to transfer the data in one direction, this type of transfer is referred to herein as a "cooperating-port" transfer.

Figure 3:
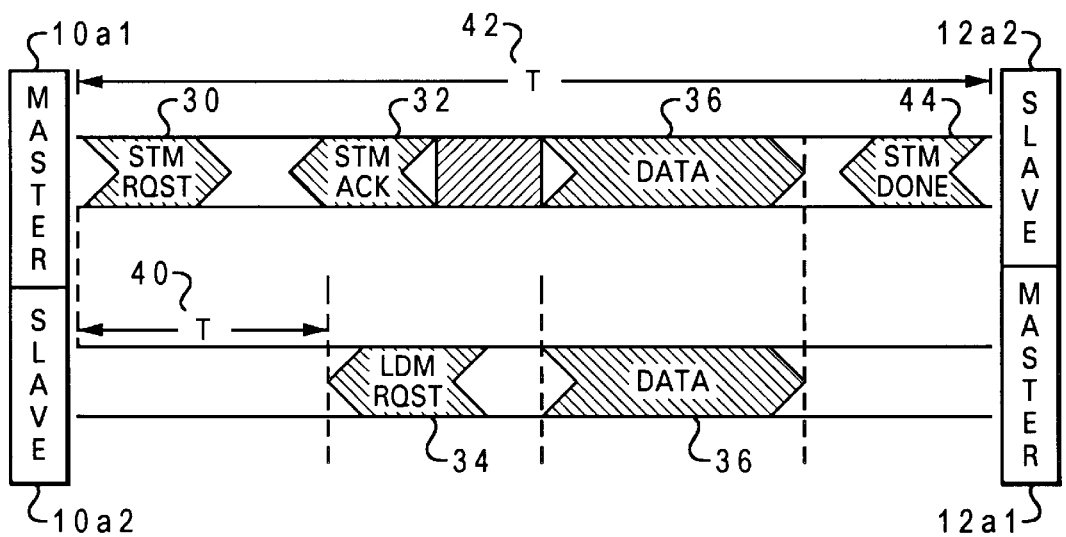
FIG. 3 is a timing diagram depicting communication establishing a cooperating-port transfer between two interconnected computing elements, where the computing elements each have a master port and a slave port.

Refer now to FIG. 3, which illustrates an aspect of the data link protocol. In this cooperating-port transfer in a master-slave port environment, the master port 10a1 of the first computing element 10 sends a request 30 according to the data link protocol. The data link request 30 identifies a second computing element for receiving data from the first computing element and asks the second computing element to execute a "store-multiple" data transfer. The first computing element 10 initiates this type of request 30, for example, at a point in executing a computer program when the first computing element 10 is required to fetch certain data.

A "store" request in general is a request by a first computing element for another computing element to receive data. In a non-cooperating port "store-multiple" the data is sent from the master port of the requesting computing element. In a cooperating-port "store-multiple," the data is sent from both the master and slave ports of the requester.

According to the predefined format of the data link protocol, the command frame of a non-cooperating-port "store-multiple" is as follows:

<slmdw><port><addrs><length0><length1><unused><cksum>.

The cooperating-port "store-multiple" is slightly different than the non-cooperating-port "store-multiple," but the cooperating-port version nevertheless conforms to the protocol used within the data layer and the switch does not distinguish the cooperating-port "store-multiple" from the non-cooperating-port "store-multiple." In the cooperating-port "store-multiple," the command frame is as follows:

<slmdw><port><addrs><length0><length1><clientid><cksum>.

The cooperating-port "store-multiple" includes identification of the requesting computing element, whereas the non-cooperating-port "store-multiple" does not.

Referring again to FIG. 3, in response to the "store-multiple" request 30 the second computing element 12 responds over its slave port 12a2 with an acknowledgement 32 back to the first computing element master port 10a1. The second computing element 12 also notifies its master port 12a1 of a highest priority pending operation, so that after the master port 12a1 has completed its current operation the master port 12a1 will not execute any other operations until it has initiated a complimentary request 34 in response to the "store-multiple" request 30. In that complimentary request 34, the second computing element master port 12a1 communicates to the slave port 10a2 of the first computing element 10, asking the first computing element 10 to execute a cooperating-port "load multiple" data transfer 34. Upon the first computing element 10 having received both the acknowledgement 32 of the requested transfer 30 and the request for a load operation 34, the first computing element 10 initiates a synchronized transfer 36 in one direction through both ports 10a1 and 10a2.

In this cooperating-port transfer in a master-slave port environment, there is an initialization period 40 having a starting time when the first computing element 10 initiates a "store-multiple" request 30 for the cooperating-port transfer 36 and having an ending time when the second computing element 12 responds by initiating a "load-multiple" request 34 to the first computing element 10 for the cooperating-port transfer 36. During the initialization period 40, the first and second computing elements 10 and 12 each have a port 10a2 and 12a1 that is free for other transfers besides the cooperating-port transfer. The other ports 10a1 and 12a2 are not available for other transfers during a period 42 starting with the initial request 30 and ending with a "store acknowledgement" 44.

In another embodiment the first and second port of each computing element have an opposing directional orientation so that one port is an input port for data in a direction into the computing element and the other port is an output port for data in a direction out of the computing element. Thus, in this input-output port environment, data to be transferred out of a computing element is ordinarily transferred through the output port of the computing element. According to the terminology used herein, data such as this is "designated" to be transferred by the output port. Similarly, in this environment, data to be transferred into the computing element is ordinarily transferred through the input port, and is herein "designated" as data to be transferred by the input port.

Figure 4:
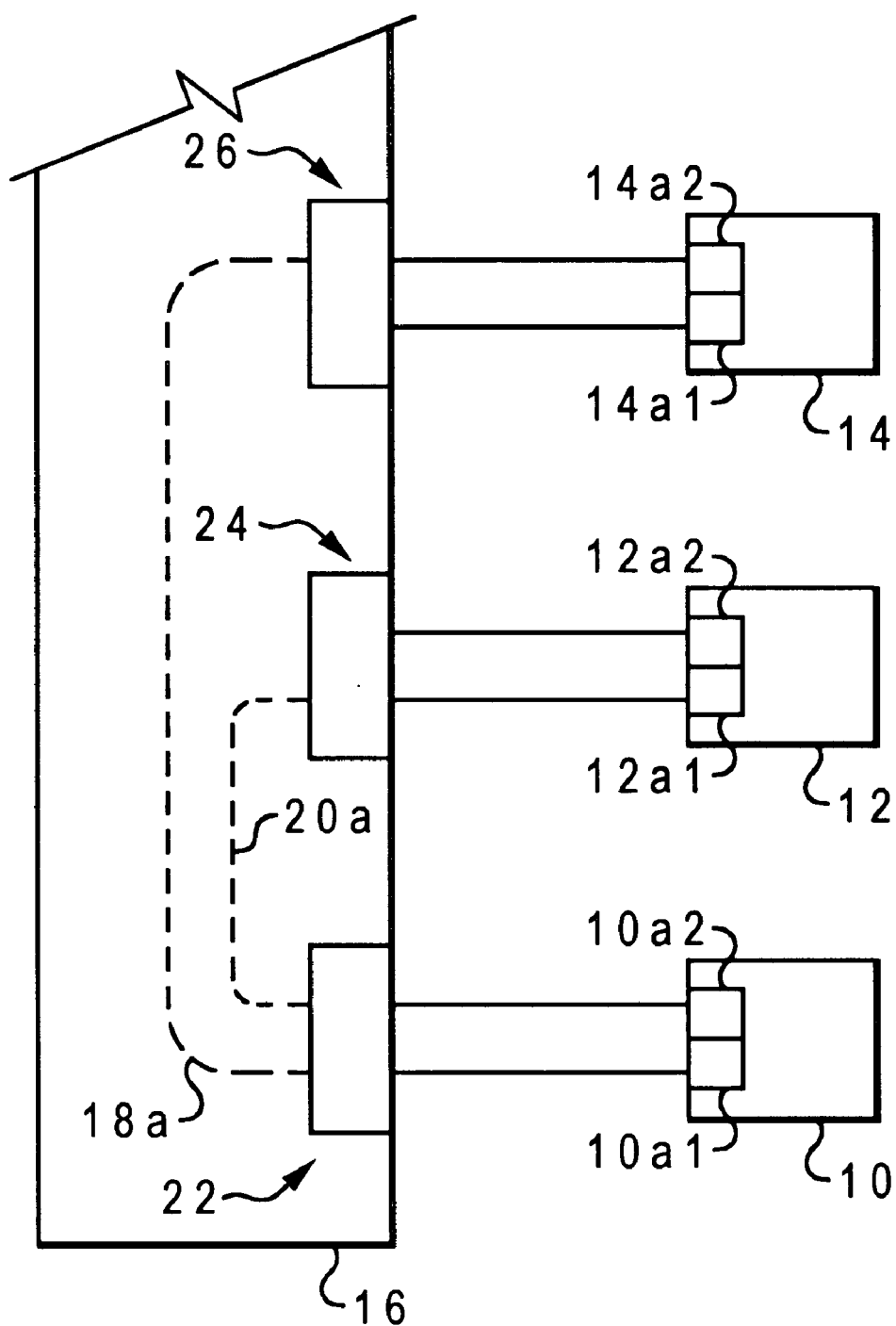
FIG. 4 is a schematic depicting one computing element having an electrical transmission circuit connected through the switch complex to a second and third computing elements.

Referring now to FIG. 4. In a "cooperating-port" type of transfer which may be executed in this embodiment, when the first computing element, e. g., 10 needs additional bandwidth or bit width to transfer a number of data packets in the direction of one of its n/2 ports 10a1, the other of its n/2 ports 10a2 is reversed to independently transfer some of those packets in the same direction as the first packet. For example, if a "cooperating-port" transfer is executed for data designated to be transferred out of a computing element 10, the input port, e. g., 10a2 on the computing element will be reversed and data packets will be transmitted out both ports 10a1 and 10a2 of the computing element 10. For example, one port 10a1 may be connected to a second computing element 14, port 14a2, and the other port 10a2 may be connected to a third computing element 12, port 12a1. This cooperating-port transfer may be initiated on an occasion when a certain or threshold amount of data is designated to be transferred out of the computing element, for example. In an input-output port environment all the data would ordinarily be transferred by only one of the ports, but in the "cooperating-port" transfer of the present invention, some of the data is transferred by a different port than usual.

Another important optional feature of the present invention in the input-output port environment is that upon one of the n/2 ports having ceased to transfer data and thereby having become available, the available port assumes a directional orientation opposing the port still transferring data. In this manner any time a port becomes available for handling data, one port is oriented in each direction. Having a port oriented in each direction may reduce the time required for a data transfer, since several machine cycles may be required to reverse the direction of data transfer from a port to a data bus. For example, to reverse the direction of a port may require a request from the port and an acknowledgement from a computing element on the bus that the bus has been released for data transfer. The request and acknowledgement may each require as much as 1½ cycles in an asynchronous environment, for a total of 3 cycles. Also, the transmission medium may introduce a delay of perhaps 3 more cycles for each transmission, for a total of 6 additional cycles.

Also, in a further enhancement of the invention, due to other priorities a cooperating-port transfer may be interrupted to the extent that one participating port is forced to become available and assume a directional orientation opposing the other port.

What is claimed is:

1. A system for bilaterally transferring data between a plurality of computing elements, comprising:
   (a) at least a first and second port on each of said plurality of computing elements, for transferring data in opposite directions;
   (b) a switch complex which directly connects with said plurality of computing elements for connecting each of said first and second ports of a first one of said plurality of computing elements to any one of said first and second ports on any others of said plurality of computing elements; and
   (c) means for causing both said first and second ports of said first computing element to transfer data in the same direction in a cooperating-port transfer in response to the data presented to said first and second ports.

2. The system of claim 1 wherein interaction among said plurality of computing elements and said switch complex takes place only through said first and second ports.

3. The system of claim 2 wherein said cooperating-port transfer is initiated by communication on a data link layer using a protocol.

4. The system of claim 3 wherein the first computing element requests that a second computing element participate in said cooperating-port transfer and said second computing element responds with a request that said first computing element participate in said transfer.

5. The system of claim 4 wherein said cooperating-port transfer request is a store-multiple request, and wherein the switch complex does not distinguish a cooperating-port store-multiple request from a non-cooperating-port store-multiple request.

6. The system of claim 3 wherein said cooperating-port transfer is initiated by the first computing element at a certain point in executing a computer program, said point being when said first computing element is required to store certain data.

7. The system of claim 3 wherein, in said cooperating-port transfer, a single packet of data is designated to be ordinarily transferred by one of the ports of said first computing element to a port on a second computing element, and both of said first computing element ports are temporarily dedicated to transfer said data packet to both of said second computing element ports.

8. The system of claim 3, wherein said first computing element and said second computing element each have a port that is free for other data transfers besides said cooperating-port transfer during an initialization period after the cooperating-port transfer has been requested, said initialization period having a starting time when the first computing element initiates a request for said cooperating-port transfer, and having an ending time when a second computing element responds by initiating a request to said first computing element for said cooperating-port transfer.

9. The system of claim 1 wherein said cooperating-port transfer request is a store-multiple request:
   wherein interaction among the computing elements and the switch complex takes place solely on said data ports;
   wherein said cooperating-port transfer is initiated by communication on a data link layer using a protocol; and
   wherein the switch complex does not distinguish a cooperating-port store-multiple request from a non-cooperating-port store-multiple request.

10. The system of claim 9, one of said ports of each computing element being a master and the other of said ports being a slave;
    wherein, in said cooperating-port transfer, the master port of said first computing element sends a first request, said request asking a second computing element slave port to store data and identifying the first computing element as the source of the data; and
    wherein the second computing element slave port responds to said request with an acknowledgement, and said second computing element master port initiates a second request asking the first computing element slave port to load data; and
    wherein the first computing element, having received both the request for a load operation and the acknowledgement of the requested store operation, transfers data to the second computing element through the first computing element master and slave ports.

11. A system for bilaterally transferring data between a plurality of computing elements, comprising:
    (a) at least two data ports on each of said plurality of computing elements, each of said two ports having a certain bit width, each operating independently of each other and transferring data in opposite directions;
    (b) switch means for connecting said two data ports of a first computing element of said plurality of computing elements to data ports of others of the plurality of computing elements; and
    (c) computing element means for causing said two data ports of said first computing element to transfer data in the same direction, in response to the data presented to said two data ports, effectively extending the bit width of one of said data ports of said first computing element.

12. The system of claim 1, wherein a cooperating-port transfer is initiated when a threshold amount of data is to be transferred in one direction by one port of a computing element.

13. The system of claim 12, said first and second ports of each computing element having usually opposing directional orientations so that one port is a usually-input port for transferring data in a direction into the computing element and the other port is a usually-output port for transferring data in an direction out of the computing element, wherein, in said cooperating-port transfer, the orientation of one of said ports of the first computing element is reversed so that both of said ports transfer data in a same direction.

14. The system of claim 13, wherein data is grouped in packets, and, in said cooperating-port transfer, data packets transferred through one of said first computing element ports are different packets than data packets transferred by the other of said first computing element ports.

15. The system of claim 14, wherein, in said cooperating-port transfer, upon one of said first computing element ports having ceased data transfer and thereby having become available for data transfer, said available port assumes an orientation opposing the first computing element port still transferring data so that said first computing element has one port oriented in each direction whenever one of said ports is available.

16. The system of claim 15, wherein said port automatically becomes available because no more data packets remain for said port to transfer as part of said cooperating port transfer.

17. The system of claim 15, wherein said port is forced to become available because said cooperating-port transfer is interrupted.

18. The system of claim 15:

wherein a cooperating-port transfer is initiated when a threshold amount of data is to be transferred in one direction by one port of a computing element; and wherein data is grouped in packets, and, in said cooperating-port transfer, data packets transferred through one of said first computing element ports are different packets than data packets transferred by the other of said first computing element ports.

19. A method for bilaterally transferring data between a plurality of computing elements, each having two ports transferring data in opposite directions, comprising the steps of:

(a) connecting a first port of a first computing element of the plurality of computing elements to one port of another computing element of the plurality of computing elements, the connection being made through a switch complex which directly connects with said plurality of computer elements;

(b) connecting a second port of said first computing element to another port of another computing element of said plurality of computing elements, the connection being through said switch complex; and (c) transferring data through one of said ports on said first computing element in the same direction as data transferred by the other of said two ports on the first computing element in response to the data presented to the first and second parts.

20. The method of claim 19, further comprising the step of:

communicating a request for said data transfer, said communication being on a data link layer of the system using a protocol, and said communication being initiated by said first computing element solely through said data ports on said first computing element.

21. The method of claim 20, further comprising the steps of:

a second computing element responding to said request with an acknowledgement; and the second computing element initiating a second request asking the first computing element for said data transfer.

22. The method of claim 19, said ports of the computing element having opposing directional orientation so that one port is an input port for transferring data in a direction into the computing element and the other port is an output port for transferring data in a direction out of the computing element, said method further comprising the step of reversing the orientation of one of said ports of the first computing element so that both of said ports transfer data in the same direction.

23. The method of claim 22, further comprising the steps of:

ceasing data transfer in one of said ports on said first computing element so that said port becomes available for data transfer; and having said available port on the first computing element assume an orientation opposing the other port on said first computing element port so that a port on the first computing element is oriented in each direction whenever one of said computing element ports is available.

24. The method of claim 23, further comprising the steps of:

initiating a transfer when a certain amount of data is to be transferred in one direction by said first port of a computing element in excess of the capability of said first port; and transferring separate data packets through each of said two ports of said first computing element.

* * * * *